(12) United States Patent
Shah

(10) Patent No.: US 8,323,382 B2
(45) Date of Patent: Dec. 4, 2012

(54) BLACK WATER TREATMENT SYSTEMS AND METHODS

(75) Inventor: Vijayalakshmi Shah, Bangalore Karnataka (IN)

(73) Assignee: General Electric Company, Schenectady, NY (US)

( * ) Notice: Subject to any disclaimer, the term of this patent is extended or adjusted under 35 U.S.C. 154(b) by 49 days.

(21) Appl. No.: 13/069,418

(22) Filed: Mar. 23, 2011

(65) Prior Publication Data

US 2012/0241388 A1  Sep. 27, 2012

(51) Int. Cl.
*B01D 19/00* (2006.01)

(52) U.S. Cl. ............. 95/246; 95/265; 95/259; 96/201

(58) Field of Classification Search .......... 95/265, 95/259, 246; 96/193, 201
See application file for complete search history.

(56) References Cited

U.S. PATENT DOCUMENTS

| | | | | |
|---|---|---|---|---|
| 5,415,673 A * | 5/1995 | Hilton et al. | ............. | 48/197 R |
| 6,036,748 A | 3/2000 | Wallace et al. | | |
| 2009/0120290 A1 | 5/2009 | Wallace et al. | | |
| 2011/0209406 A1 * | 9/2011 | Chinnadurai | ............. | 48/62 R |
| 2011/0209407 A1 * | 9/2011 | Arya et al. | ............. | 48/62 R |

FOREIGN PATENT DOCUMENTS

| | | |
|---|---|---|
| CN | 101 306 899 B | 9/2010 |
| EP | 0 219 612 A2 | 4/1987 |
| WO | 98/55195 A1 | 12/1998 |

* cited by examiner

*Primary Examiner* — Duane Smith
*Assistant Examiner* — Douglas Theisen
(74) *Attorney, Agent, or Firm* — Sutherland Asbill & Brennan LLP

(57) ABSTRACT

A black water treatment system for a flow of black water. The black water treatment system may include one or more non-vacuum flash drums and a scrub-cooler. The scrub-cooler may include a water pathway with a nitrogen tube and a flow of nitrogen therein.

19 Claims, 2 Drawing Sheets

BLACK WATER TREATMENT SYSTEMS AND METHODS

TECHNICAL FIELD

The present application and the resultant patent relate generally to the production of syngas and more particularly relate to systems and methods for the treatment and recycling of a flow of black water that results therefrom with reduced parasitical energy losses.

BACKGROUND OF THE INVENTION

Generally described, synthetic gas, or syngas, may be produced in a gasification reactor by reacting a carbonaceous fuel in a partial oxidation process. The syngas then may be sent to a number of scrubbers for removing contaminants and fine particles therein. Specifically, the syngas may include hydrogen sulfide, ammonia, cyanides, phenols, various halogens, and particulates in the form of carbon, ash, coal, trace metals, and the like. These contaminants and fines must be disposed of in a satisfactory manner for the gasification process to be economically and environmentally viable.

A large quantity of water is required for use in the overall gasification process. Specifically, water may be used in the gasification reactor for quenching the syngas. Further, water also may be used in the scrubbers for removing the fines. The water used in the scrubbers may become what is known as "black water" because it is contaminated with carbon, ash, and the like. The black water also may contain soluble gases therein. The black water may have about five percent (5%) to about ten percent (10%) by weight of suspended solids therein and may have an initial temperature of about 300 degrees Celsius or more.

Known techniques to clean and recycle this black water generally involve the use of a flash system. Such a flash system may include a number of flash drums positioned in stages from high pressure, to low pressure, to low vacuum, and to high vacuum. The vacuum stages not only help to remove the dissolve gases, but also help to cool the black water. The black water from the flash system may be sent to a gravity settler. The fines may be removed and clear water may be recycled in the gravity settler. The solids from the gravity settler then may be sent for grinding to prepare a slurry that may be fed to the gasifier and combusted therein.

The use of flash drums up to atmospheric pressure may be economical in that no additional energy is required to remove the dissolved gases. The use of flashing in vacuuming conditions, however, generally requires large equipment with significant energy demands and maintenance requirements. Specifically, such a vacuum system requires large amounts of energy in that the flash drums remove only dissolved gases but also a significant quantity of water vapor. High cooling water consumption therefore may be required to condense the water vapor. This water and energy consumption is considered a parasitical loss on the power plant as a whole.

There is thus a desire for improved black water treatment and recycling system and methods. Preferably, such improved systems and methods may treat and recycle black water produced by a gasifier and the like without requiring the large devices and high energy demands found in known flash systems using vacuum conditions.

SUMMARY OF THE INVENTION

The present application and the resultant patent thus provide a black water treatment system for a flow of black water. The black water treatment system may include one or more non-vacuum flash drums and a scrub-cooler. The scrub-cooler may include a water pathway with a nitrogen tube and a flow of nitrogen therein.

The present application and the resultant patent further provide a method of treating a flow of black water. The method may include the steps of flashing the flow of black water to atmospheric pressure, inserting a flow of nitrogen into the flow of black water to agitate the flow of black water and to strip dissolved gases in the flow of black water, and indirectly cooling the flow of black water.

The present application and the resultant patent further provide a black water treatment system for a flow of black water. The black water treatment system may include a high pressure flash drum, an atmospheric pressure flash drum, and a scrub-cooler. The scrub-cooler may include a water pathway with a nitrogen tube and a flow of nitrogen therein.

These and other features and improvements of the present application and the resultant patent will become apparent to one of ordinary skill in the art upon review of the following detailed description when taken in conjunction with the several drawings and the appended claims.

DETAILED DESCRIPTION

Figure 1:
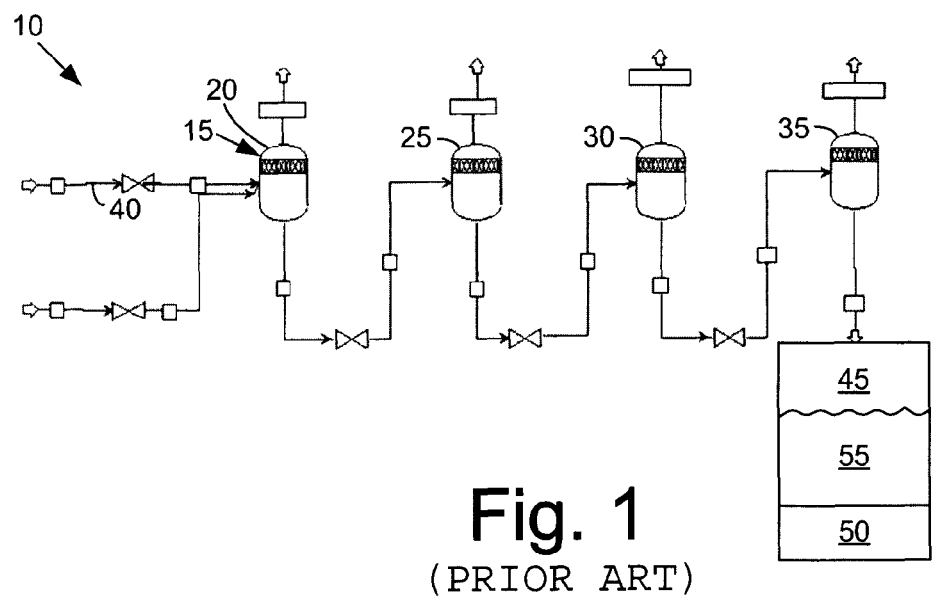
FIG. 1 is schematic view of a known black water treatment system with a flash system using multiple flash drums.

Referring now to the drawings, in which like numerals refer to like elements throughout the several views, FIG. 1 shows an example of a portion of a known black water treatment system 10. As described above, the black water treatment system 10 may include a flash system 15. The flash system 15 may include a high pressure flash drum 20, a low pressure flash drum 25, a low vacuum flash drum 30, and a high vacuum flash drum 35. Other types of flash drums also may be used. The flash system 15 serves to remove dissolved gases in a flow of black water 35 and also to cool the fluid stream. Other components and other configurations may be used herein.

Specifically, the flow of black water 40 is sent through the flash system 15 so as to reduce the temperature and pressure while increasing the flow rate. As described above, the use of the vacuum flash drums 30, 35 requires a considerable amount of parasitic energy. The black water 40 then may be sent to a gravity settler 45 where a collection of fines 50 settles in the bottom and leaves a flow of clear water 55 on top. The clear water 55 may be used for cooling and other purposes.

Figure 2:
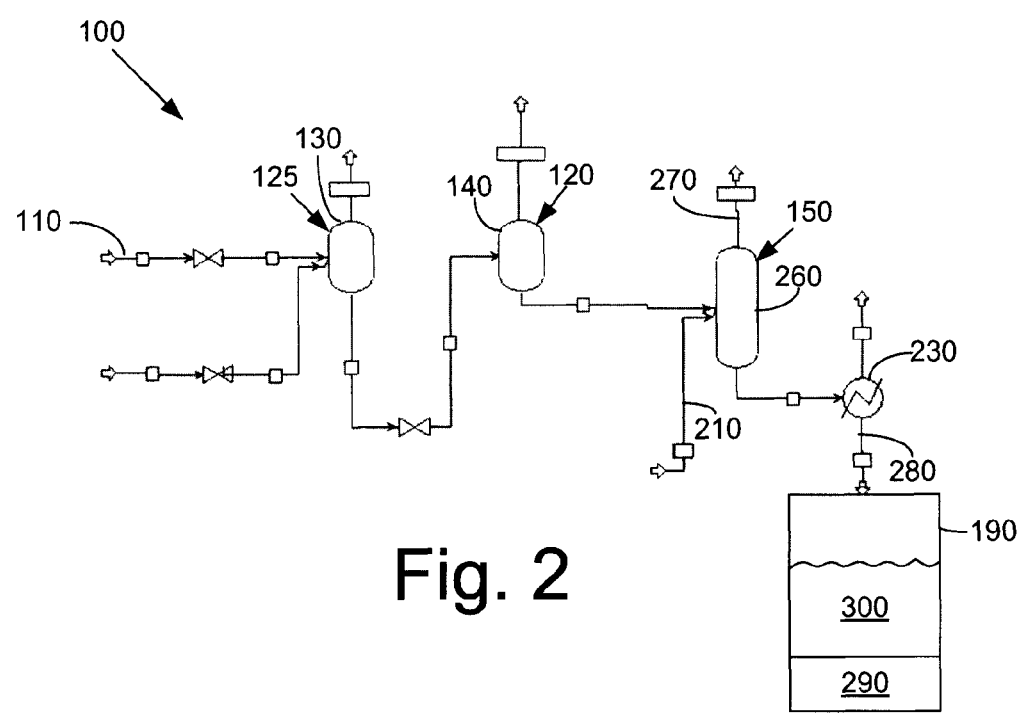
FIG. 2 is a schematic view of a black water treatment system as may be described herein.

FIG. 2 shows a black water treatment system 100 as may be described herein. The black water treatment system 100 cleans and recycles one or more flows of black water 110. The black water treatment system 100 may include a flash system 120. In the flash system 120, however, only a number of non-vacuum flash drums 125 may be used: a high pressure flash drum 130 and an atmospheric pressure flash drum 140. The flow of black water 110 thus is flashed to atmospheric pressure in the flash drums 130, 140 as opposed to a vacuum as is described above. Other types and numbers of non-vacuum flash drums 125 may be used herein.

Figure 3:
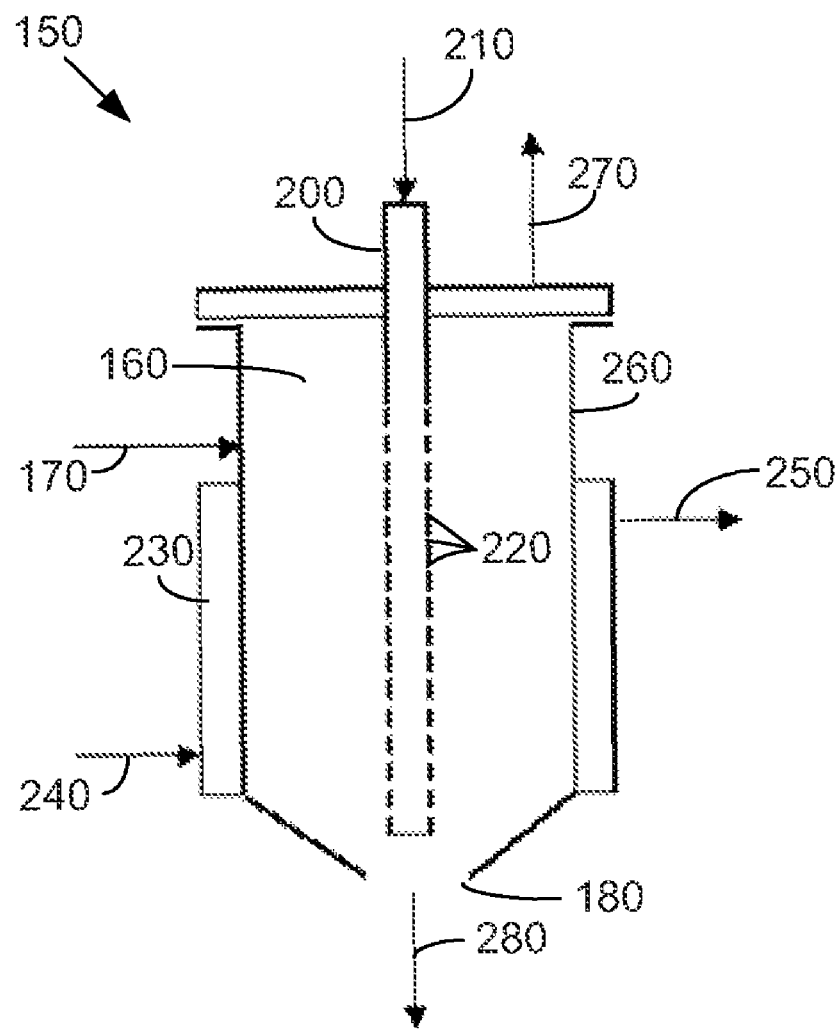
FIG. 3 is a schematic view of a scrub-cooler as may be used with the black water treatment system of FIG. 2.

The flow of black water 110 then may be sent to a scrubbing and cooling vessel 150 ("a scrub-cooler"). An example of the scrub-cooler 150 is shown in FIG. 3. The scrub-cooler 150 may have an internal water pathway 160 extending from a water entry port 170 in communication with the flash system 120 and a water exit port 180. The water exit port 180 may be in communication with a gravity settler 190 and the like. The scrub-cooler 150 also may include an internal nitrogen tube 200. The nitrogen tube 200 may have a flow of nitrogen 210 therein. The nitrogen tube 200 may have a number of tube apertures 220 positioned thereon. Any number or shape of the tube apertures 220 may be used herein. The nitrogen tube 20 extends along the length of the water pathway 160.

A water jacket 230 may surround the scrub-cooler 150. The water jacket 230 may have a cooling water supply port 240 and a cooling water return port 250 in communication with a cooling water source (not shown). The water jacket 230 provides indirect cooling to the flow of black water 110.

The scrub-cooler 150 uses the flow of nitrogen 210 as a scrubbing media and for agitation of the flow of black water 110. Specifically, the flow of nitrogen strips 210 dissolved gases in the flow of black water 110 and cools the flow to a lower temperature. The final desired temperature may be achieved by further cooling the black water 110 via the water jacket 230. Moreover, sparging the flow of nitrogen 210 in the black water flow 110 provides agitation for enhanced heat transfer. The flow of nitrogen 210 bubbles through the tube apertures 230 and rises through the liquid towards the surface. Bubbles in the flow of nitrogen 210 may be compressed by hydrostatic pressure and thus expand on the way towards the surface. The scrub-cooler 150 therefore may take an elongated shape 260 so as to make the path to the flow of nitrogen 210 as long as possible for improved interaction therein. A nitrogen vent 270 may be used herein to vent the nitrogen bubbles and the like.

In use, the flow of black water 110 enters the black water treatment system 100 via the flash system 120. The flow of black water 110 passes through the high pressure flash drum 130 and the atmospheric pressure flash drum 140 for a reduction in temperature and pressure. The flow of black water 110 then enters the scrub-cooler 150 via the water entry port 170. Likewise, the flow of nitrogen 210 enters the nitrogen tube 200 and flows through the tube apertures 220. The flow of nitrogen 210 thus provides both agitation and scrubbing in the flow of black water 110. The flow of black water 110 may be further cooled via the water jacket 230 as it passes therethrough. A now scrubbed flow 280 thus may exit the scrub-cooler 150 via the water exit port 180. The scrubbed flow 280 may pass to a gravity settler 190 or other device so as to separate out the fines 290 and the flow of clear water 300 as described above.

The black water treatment system 100 thus provides cooling for the flow of black water 110 without the uses of the vacuum flash drums 30, 35 described above. The black water treatment system 100 therefore does not require a vacuum system and the associated parasitic energy requirements. Further cooling of the flow of black water 110 likewise is provided by the water jacket 230. The use of indirect cooling via the water jacket 230 eliminates the requirement for shell and tube or other types of heat exchangers that may be fouled due to the suspended solids in the flow of black water 110. Moreover, the consumption of cooling water in the scrub-cooler 150 described herein is limited to atmospheric scrubbing conditions. Further, elimination of the vacuum drums 30, 35 allows the black water treatment system 100 to have a smaller overall footprint as compared to known devices.

It should be apparent that the foregoing relates only to the preferred embodiments of the present application and the resultant patent. Numerous changes and modifications may be made herein by one of ordinary skill in the art without departing from the general spirit and scope of the invention as defined by the following claims and the equivalents thereof.

I claim:

1. A black water treatment system for a flow of black water, comprising:
   one or more non-vacuum flash drums; and
   a scrub-cooler;
   wherein the scrub-cooler comprises a water pathway with a nitrogen tube and a flow of nitrogen therein.

2. The black water treatment system of claim 1, wherein the one or more non-vacuum flash drums comprise a high pressure flash drum.

3. The black water treatment system of claim 1, wherein the one or more non-vacuum flash drums comprise an atmospheric pressure flash drum.

4. The black water treatment system of claim 1, wherein the water pathway comprises a water entry port in communication with the one or more non-vacuum flash drums.

5. The black water treatment system of claim 1, further comprising a gravity settler for separating a plurality of fines and flow of clear water therein and wherein the water pathway comprises a water exit port in communication with the gravity settler.

6. The black water treatment system of claim 1, wherein the nitrogen tube comprises a plurality of tube apertures therein for the flow of nitrogen to pass into the water pathway.

7. The black water treatment system of claim 1, wherein the scrub cooler comprises a cooling water jacket thereon for indirect cooling.

8. The black water treatment system of claim 7, wherein the water jacket comprises a cooling water supply port and a cooling water exit port.

9. The black water treatment system of claim 1, further comprising a scrubbed flow exiting the scrub-cooler.

10. The black water treatment system of claim 1, wherein the scrub-cooler comprises a nitrogen vent.

11. The black water treatment system of claim 1, wherein the scrub-cooler comprises an elongated shape.

12. A method of treating a flow of black water, comprising:
    flashing the flow of black water to atmospheric pressure;
    inserting a flow of nitrogen into the flow of black water to agitate the flow of black water and to strip dissolved gases in the flow of black water; and
    indirectly cooling the flow of black water.

13. The method of claim 12, further comprising flowing a scrubbed flow to a gravity settler.

14. The method of claim 13, further comprising separating a plurality of fines and a flow of clear water in the gravity settler.

15. A black water treatment system for a flow of black water, comprising:
    a high pressure flash drum;
    an atmospheric pressure flash drum; and
    a scrub-cooler;
    wherein the scrub-cooler comprises a water pathway with a nitrogen tube and a flow of nitrogen therein.

16. The black water treatment system of claim 15, wherein the water pathway comprises a water entry port in communication with the atmospheric pressure flash drum.

17. The black water treatment system of claim 15, further comprising a gravity settler and wherein the water pathway comprises a water exit port in communication with the gravity settler.

18. The black water treatment system of claim 15, wherein the nitrogen tube comprises a plurality of tube apertures therein for the flow of nitrogen to pass into the water pathway.

19. The black water treatment system of claim 15, wherein the scrub cooler comprises a cooling water jacket thereon for indirect cooling.

* * * * *